US009623890B1

(12) United States Patent
Horowitz

(10) Patent No.: US 9,623,890 B1
(45) Date of Patent: Apr. 18, 2017

(54) FOLDING WAGON HAVING A COOLER AND A REMOVABLE TABLE CONNECTED THERETO

(71) Applicant: Brian Horowitz, Foothill Ranch, CA (US)

(72) Inventor: Brian Horowitz, Foothill Ranch, CA (US)

( * ) Notice: Subject to any disclaimer, the term of this patent is extended or adjusted under 35 U.S.C. 154(b) by 0 days.

(21) Appl. No.: 15/131,523

(22) Filed: Apr. 18, 2016

(51) Int. Cl.
*B62B 3/02* (2006.01)
*B62B 3/00* (2006.01)

(52) U.S. Cl.
CPC .............. *B62B 3/022* (2013.01); *B62B 3/004* (2013.01); *B62B 3/005* (2013.01)

(58) Field of Classification Search
CPC ......... B62B 3/022; B62B 3/002; B62B 3/005; B62B 3/007; B62B 3/1436; B62B 1/04; B62B 1/20; B62B 5/0013
See application file for complete search history.

(56) References Cited

U.S. PATENT DOCUMENTS

| | | | | |
|---|---|---|---|---|
| 2,992,833 A * | 7/1961 | Hoedinghaus | ........... | B25H 1/00 211/149 |
| 3,889,967 A * | 6/1975 | Sauer | ................... | B62B 5/0013 280/47.35 |
| 4,460,188 A * | 7/1984 | Maloof | .................... | B62B 1/20 280/30 |
| 4,679,818 A * | 7/1987 | Kakavas | ................... | A47F 3/14 108/90 |
| 4,960,302 A * | 10/1990 | Walters | ................. | B62B 3/1436 150/166 |
| 5,169,164 A * | 12/1992 | Bradford | .................... | B62B 1/20 190/18 A |
| 5,551,558 A * | 9/1996 | Bureau | ..................... | A45C 9/00 190/11 |
| 5,857,695 A * | 1/1999 | Crowell | .................. | B62B 3/007 280/30 |
| 6,176,499 B1 * | 1/2001 | Conrado | .................. | A45C 5/14 280/47.26 |
| 6,213,532 B1 * | 4/2001 | Dunyon | .................... | B62B 1/20 280/47.3 |
| 6,216,488 B1 * | 4/2001 | Rucker | .................. | A45B 11/00 62/331 |
| 6,237,998 B1 * | 5/2001 | Aprile | ..................... | B62B 3/144 297/219.12 |
| 6,454,340 B1 * | 9/2002 | Miller | ........................ | B60J 7/10 135/136 |

(Continued)

*Primary Examiner* — Erez Gurari
(74) *Attorney, Agent, or Firm* — Morland C. Fischer

(57) ABSTRACT

A combination including a folding wagon having pairs of front and back wheels, a frame, a fabric basket coupled to the frame, a cooler located within the basket to carry food and beverages to he kept cold, and a flexible table removably attached to the wagon at the frame thereof. The wagon is capable of being folded from an expanded configuration, at which the cooler is transported within the basket, to a compact collapsed configuration to facilitate storage or transport of the wagon. The flexible table is also detachably connected to the top of the cooler so that the table is held over the open top of the wagon basket by the cooler. The cooler is disconnected from the table to be lifted out of the wagon basket and removed from the wagon by way of a cooler access opening formed through the top of the table.

20 Claims, 6 Drawing Sheets

(56) References Cited

U.S. PATENT DOCUMENTS

| | | | | |
|---|---|---|---|---|
| 6,491,318 B1 * | 12/2002 | Galt | ............... | B62B 3/02 |
| | | | | 280/42 |
| D548,921 S * | 8/2007 | Gaddy | ............... | D34/27 |
| 7,275,758 B1 * | 10/2007 | Diaz | ............... | A45C 3/04 |
| | | | | 280/33.995 |
| 7,374,182 B2 * | 5/2008 | Gurley | ............... | B62B 3/1464 |
| | | | | 280/33.992 |
| D615,271 S * | 5/2010 | Bruner | ............... | D34/27 |
| 8,011,686 B2 | 9/2011 | Chen | | |
| 8,220,824 B2 | 7/2012 | Chen | | |
| 8,388,015 B2 | 3/2013 | Chen | | |
| 8,556,740 B1 * | 10/2013 | Schneider | ............... | A63H 33/32 |
| | | | | 446/465 |
| 8,973,940 B2 * | 3/2015 | Chen | ............... | B62B 3/02 |
| | | | | 280/35 |
| 9,022,395 B1 * | 5/2015 | Vanderberg | ............... | F25D 3/08 |
| | | | | 280/47.131 |
| 9,085,311 B1 * | 7/2015 | Chen | ............... | B62B 3/007 |
| 9,101,206 B1 * | 8/2015 | Chen | ............... | B62B 3/007 |
| 9,145,154 B1 * | 9/2015 | Horowitz | ............... | B62B 3/025 |
| 9,205,951 B1 * | 12/2015 | Roman | ............... | B65D 21/0233 |
| 9,248,065 B1 * | 2/2016 | Tu | ............... | B62B 3/022 |
| 9,282,797 B1 * | 3/2016 | Soto | ............... | A45C 11/20 |
| 9,452,768 B2 * | 9/2016 | Fodrocy | ............... | B62B 3/004 |
| 2010/0156069 A1 * | 6/2010 | Chen | ............... | B62B 3/007 |
| | | | | 280/639 |
| 2011/0127796 A1 * | 6/2011 | Fontenot-Martin | ... | B62B 3/1436 |
| | | | | 296/100.01 |
| 2011/0204598 A1 * | 8/2011 | Stevenson | ............... | B62B 3/02 |
| | | | | 280/639 |
| 2011/0226003 A1 * | 9/2011 | Chaney | ............... | A45C 5/065 |
| | | | | 62/457.7 |
| 2012/0223494 A1 * | 9/2012 | Greene | ............... | B25H 1/04 |
| | | | | 280/29 |
| 2012/0313397 A1 * | 12/2012 | Carter | ............... | B62B 3/1436 |
| | | | | 296/100.01 |
| 2014/0062042 A1 * | 3/2014 | Wagner | ............... | A45C 11/20 |
| | | | | 280/30 |
| 2014/0077467 A1 * | 3/2014 | Galante | ............... | B62B 1/12 |
| | | | | 280/35 |
| 2014/0353945 A1 * | 12/2014 | Young | ............... | B62B 3/02 |
| | | | | 280/650 |
| 2015/0145224 A1 * | 5/2015 | Zhu | ............... | B62B 3/025 |
| | | | | 280/42 |
| 2015/0151771 A1 * | 6/2015 | Jin | ............... | B62B 3/027 |
| | | | | 280/651 |

* cited by examiner

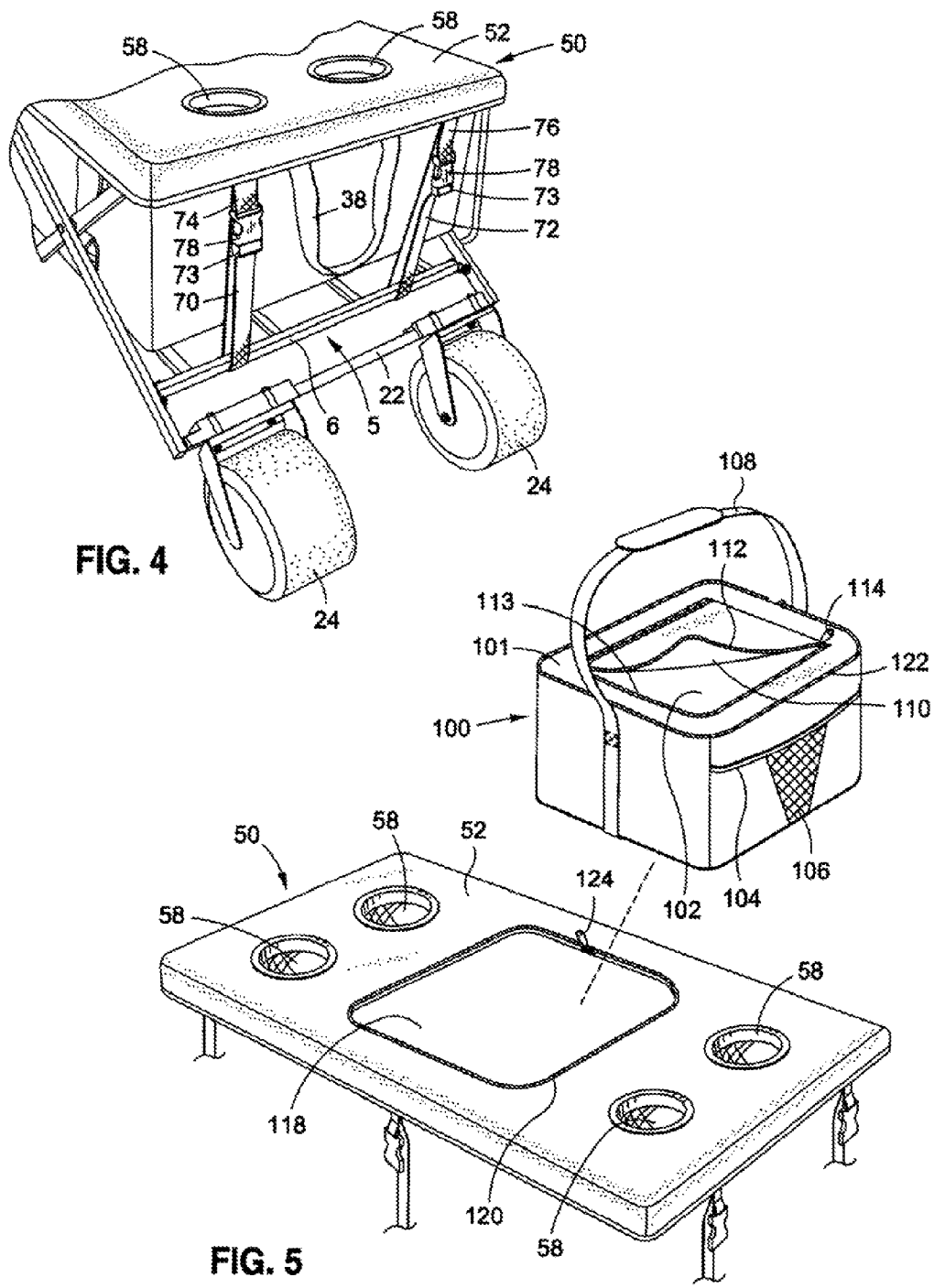

FOLDING WAGON HAVING A COOLER AND A REMOVABLE TABLE CONNECTED THERETO

BACKGROUND OF THE INVENTION

1. Field of the Invention

This invention relates, in part, to a folding wagon that is capable of being folded from an expanded open configuration, at which a variety of articles or small children are carried in a basket of the wagon, to a compact collapsed configuration at which to facilitate the storage or transport of the wagon when it is not being used. A flexible table is detachably connected to a food and beverage cooler that is carried within the wagon basket so that the table is held across the open top of the basket when the folding wagon in its expanded open configuration.

2. Background Art

Wagons are known which are capable of being folded between open and collapsed configurations. Some folding wagons have a fabric basket that is sized to carry a variety of articles or small children when the wagon is unfolded for use in its open configuration. One example of such a folding wagon is available by referring to my U.S. Pat. No. 9,145,154 entitled FOLDING WAGON issued on Sep. 29, 2015.

My patented wagon has pairs of front and rear wheels and a handle to permit the wagon to be pulled over surfaces that lie both indoors and outdoors. To this end, my wagon can be used to transport food and beverages within the basket thereof for consumption at the beach, a sporting event, a picnic and the like. Nevertheless, once my wagon reaches its destination, a table is not always readily available so that the food and beverages can be removed from the wagon basket and laid out for display and consumption. What is more, in cases where the outside temperature will be high and/or the food will not be immediately consumed, it is common to transport the food in a bulky and heavy cooler to prevent spoilage.

To solve the aforementioned problems and expand the application of a folding wagon like mine, it would be desirable to have available an easy to attach and easy to remove table that is capable of covering the open top of the basket of the wagon so that food and beverages removed from the basket can be laid out for selection and consumption. It would also be desirable for the folding wagon to carry a removable cooler below the removable table so that beverages and perishable food items may be kept cold in order to avoid spoilage prior to consumption.

SUMMARY OF THE INVENTION

In general terms, disclosed herein is a folding wagon which includes a flexible basket, a cooler located within the flexible basket to be transported by the wagon, and a flexible table that is removably attached to the wagon to cover the open top of the basket. The folding wagon is generally known and is pulled at a handle in order to transport a variety of articles and/or small children that are located in the wagon basket. The folding wagon also includes a frame having a basket support rack upon which the wagon basket is seated and supported. The frame is adapted to be folded so that the wagon is correspondingly folded from an expanded open configuration during use to a compact collapsed configuration to facilitate transport and/or storage of the wagon when it is not in use. The wagon includes pairs of front and rear wheels attached to the wagon frame to roll over a surface in response to a pulling or a pushing force being applied to the wagon handle.

The flexible table has a flat top that extends over and surrounds the top of the wagon basket to create a surface upon which food, beverage containers, utensils, and the like can be laid at a picnic or other event at which food and/or drink will be consumed. First and second pairs of table attachment straps extend, respectively, from the front and rear of the flexible table. First and second table attachment straps extend, respectively, from first and opposite sides of the table. A locking clip is attached to one end of each of the table attachment straps. To attach the table to the wagon, the table attachment straps are first pulled under and around the wagon frame. The locking clips of the attachment straps are then moved into detachable mating engagement with respective complementary locking sleeves that are attached to table coupling straps located adjacent the attachment straps. The locking clips are detached from their locking sleeves to permit the flexible table to be pulled off and separated from the folding wagon.

The cooler that is transported in the basket of the folding wagon has a hollow interior compartment in which beverage containers, food and ice can be carried. A closure is located on the top of the cooler to be opened or closed by means of a pair of adjacent zipper tracks. By moving a first zipper pull tab in a first direction around the zipper tracks, the closure is closed over the top of the cooler to prevent access to the hollow interior compartment. By moving the zipper pull tab in an opposite direction around the zipper tracks, the closure is opened to permit access to and the removal of the contents of the hollow interior compartment. A cooler access opening is formed in the top of the table so that the cooler is removably received therethrough to lay upon and be carried within the wagon basket. A second pair of adjacent zipper tracks surrounds the cooler access opening and the outside of the cooler. By moving a second zipper pull tab in a first direction around the zipper tracks, the cooler is connected to the top of the flexible table so that the table is held over the open top of the wagon basket. By moving the zipper pull tab in an opposite direction, the cooler is disconnected from the top of the flexible table, so that a lifting force applied to a handle of the cooler will remove the cooler from the folding wagon by way of the cooler access opening formed in the top of the flexible table.

BRIEF DESCRIPTION OF THE DRAWINGS

FIG. 4 shows the rear of the flexible table removably attached to the rear of the folding wagon;

FIG. 5 is an exploded view showing the cooler being pulled out of and removed from the folding wagon by way of a cooler access opening formed through the table;

DESCRIPTION OF THE PREFERRED EMBODIMENT

Figure 1:
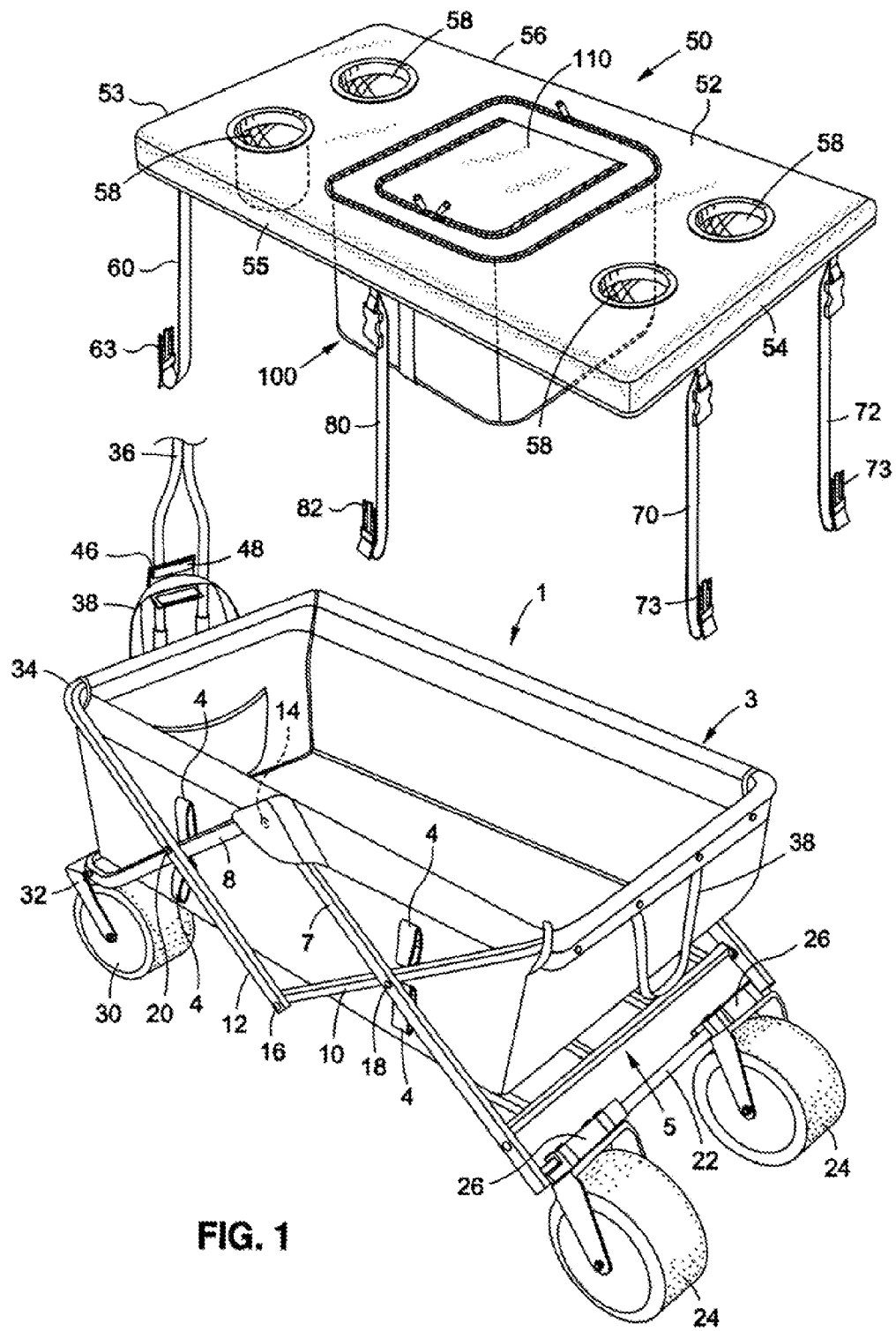
FIG. 1 is an exploded view showing a folding wagon in an expanded open configuration and a flexible table which, in accordance with a preferred embodiment of this invention, is adapted to be removably attached to the folding wagon and detachably connected to a cooler that is carried within a basket of the wagon.

Referring initially to FIG. 1 of the drawings, there is shown a folding wagon 1 and a removable table 50 that is capable of being removably attached to and carried by the folding wagon. The folding wagon 1 is adapted to be folded between an expanded open configuration during use and a compact collapsed configuration (best shown in FIGS. 7-9) at which to facilitate its storage or transport when not in use. Folding wagons like that shown in FIG. 1 are known. For example, reference can be made to my U.S. Pat. No. 9,145,154 which shows and describes a folding wagon of the kind to which the table 50 can be removably attached. Therefore, it is to be understood that the particular folding wagon shown in FIG. 1 is for the purpose of example and should not be regarded as a limitation of this invention. Accordingly, only a brief description of the folding wagon 1 will be provided below.

The folding wagon 1 includes a fabric basket 3 within which to carry a variety of articles including, but not limited to, sporting and camping goods, picnic supplies, business inventory and even small children. The fabric basket 3 is open at the top and closed along the bottom, front, rear and sides. Pairs of closed loops 4 are attached to each side of the basket 3 by which to carry fishing poles or the like. The basket 3 sits upon and is supported by a folding frame which includes a flat basket support rack 5 that lies at the bottom of the wagon 1. The basket support rack 5 has opposite ends (designated 40 and 42 in FIG. 6) that are pivotally connected together and capable of being rotated downwardly towards one another so as to lie face-to-face in response to an uplifting pulling force (designated 44 in FIG. 6) applied to a loop (46 of FIG. 6) that is attached to the bottom of the basket 3 when the wagon is being folded to its compact collapsed configuration.

However, it is to be understood that the advantages of this invention and the removable table 50 to be attached to the folding wagon 1 and described in greater detail hereinafter are also applicable to wagons which do not fold. In that case, the basket support rack 5 will remain flat such that the opposite ends 40 and 42 thereof remain stationary and do not rotate.

Figure 7:
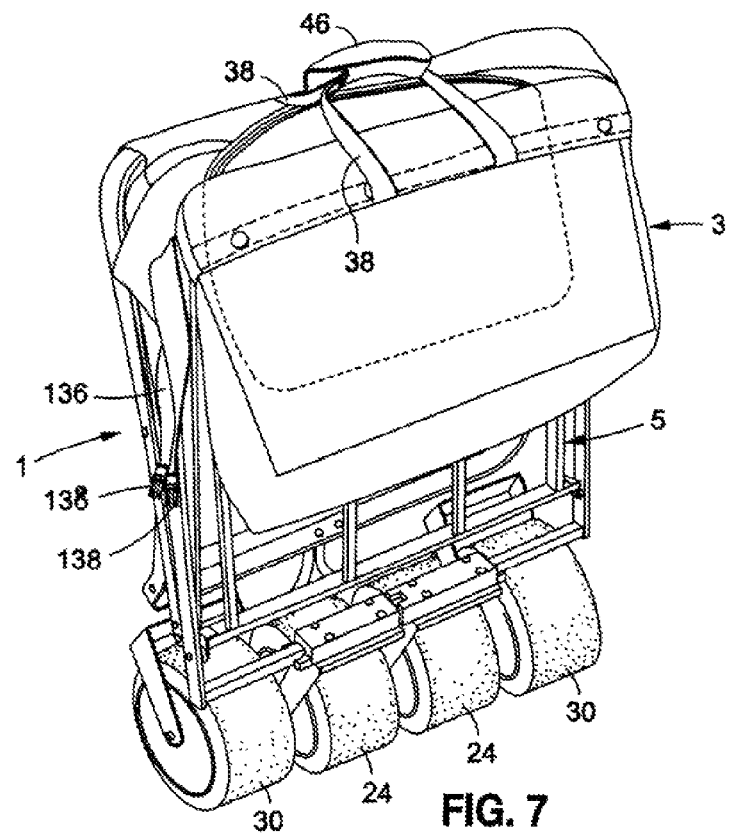
FIG. 7 shows the rear of the folding wagon after being folded to the compact collapsed configuration with the flexible table removed from the wagon.
Figures 8, 9:
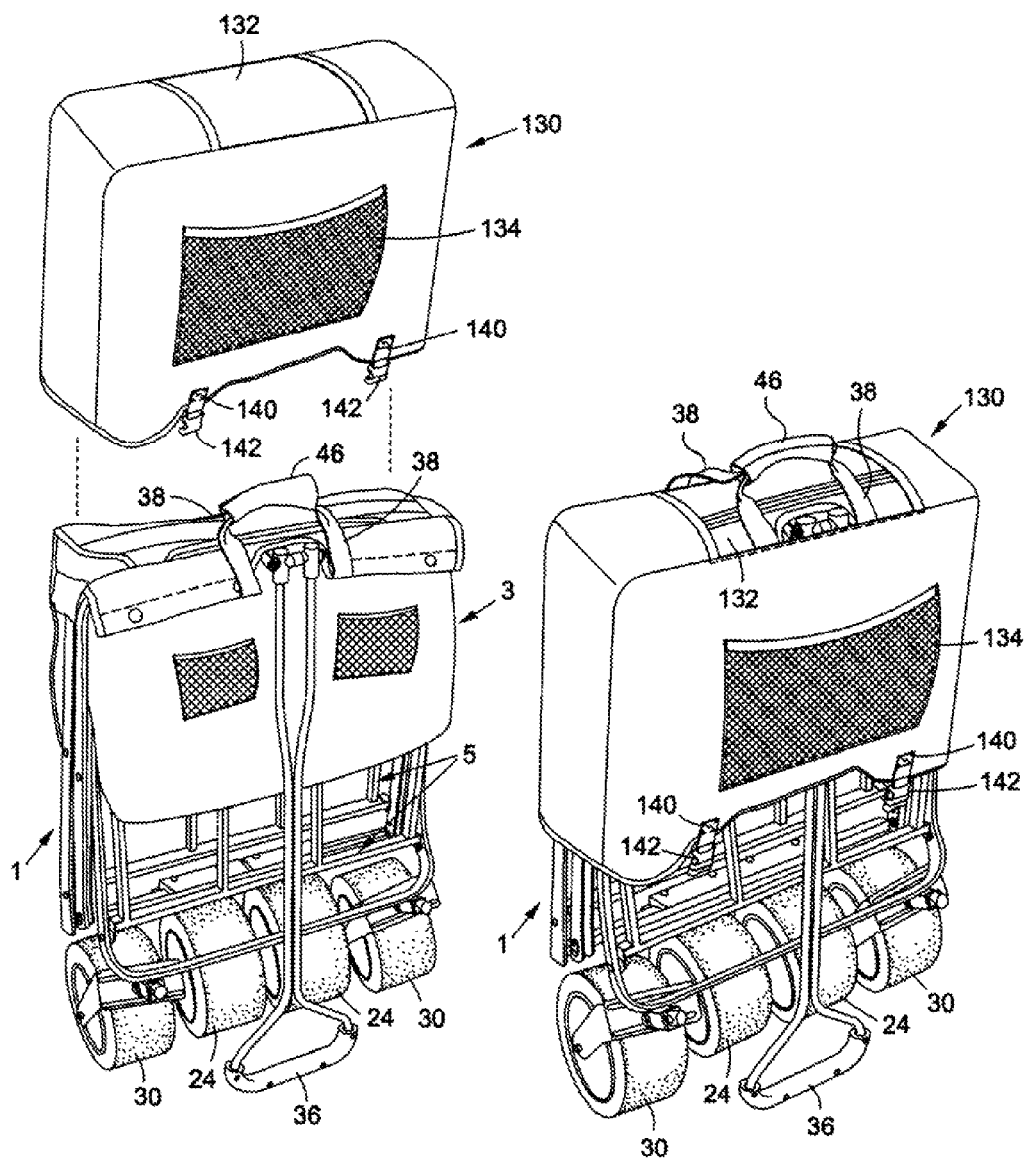
FIG. 8 is an exploded view showing the front of the folding wagon and a removable hood to cover and retain the wagon in its compact collapsed configuration.
FIG. 9 shows the removable hood of FIG. 8 covering and retaining the folding wagon in its compact collapsed configuration.

The folding frame of the folding wagon 1 that is shown in FIG. 1 is folded to enable the wagon to be correspondingly folded from its expanded open configuration of FIG. 1 at which articles are carried in the basket 3 to its compact collapsed configuration of FIGS. 7-9 at which the basket 3 is collapsed upon itself and the wagon is suitable for transport or storage. Prior to it being folded, the folding frame also holds the basket 3 up so as to be seated on and supported by the basket support rack 5. Reference may be made to my aforementioned U.S. Pat. No. 9,145,154 which is incorporated herein by reference for details to explain the attachment of the basket 3 to the folding wagon frame so that the basket 3 is held above the basket support rack 5.

Briefly, each side of the wagon frame which lies along one side of the wagon basket 3 is identical and includes a first pair of side support arms 7 and 8 and a second pair of side support arms 10 and 12. The first pair of side support arms 7 and 8 are connected to one another at first ends thereof by means of a pivot coupling 14, so that the support arms 7 and 8 project upwardly to make an angle of about 90 degrees. The second pair of side support arms 10 and 12 are also connected to one another at first ends thereof by means of a pivot coupling 16, so that the support arms 10 and 12 project downwardly to make an angle of about 90 degrees. The side support arms 7 and 10 are coupled to one another about midway between the first and opposite ends thereof by means of a pivot coupling 18, and the side support arms 8 and 12 are coupled to one another about midway between the first and opposite ends thereof by means of a pivot coupling 20.

The opposite end of the side support arm 7 of the first pair of side support arms 7 and 8 is connected to one end of a rear wheel support track 22. The rear wheel support track 22 is spaced from and located behind the basket support rack 5 at which a pair of rear wheels 24 of the folding wagon 1 are mounted. Each rear wheel 24 is attached to a collar 26 that surrounds and is slidable back and forth along the rear wheel support track 22. The collars 26 slide towards one another so that the rear wheels 24 move together to enable the wagon 1 to be folded into its compact collapsed configuration as shown in FIGS. 7-9.

Figure 6:
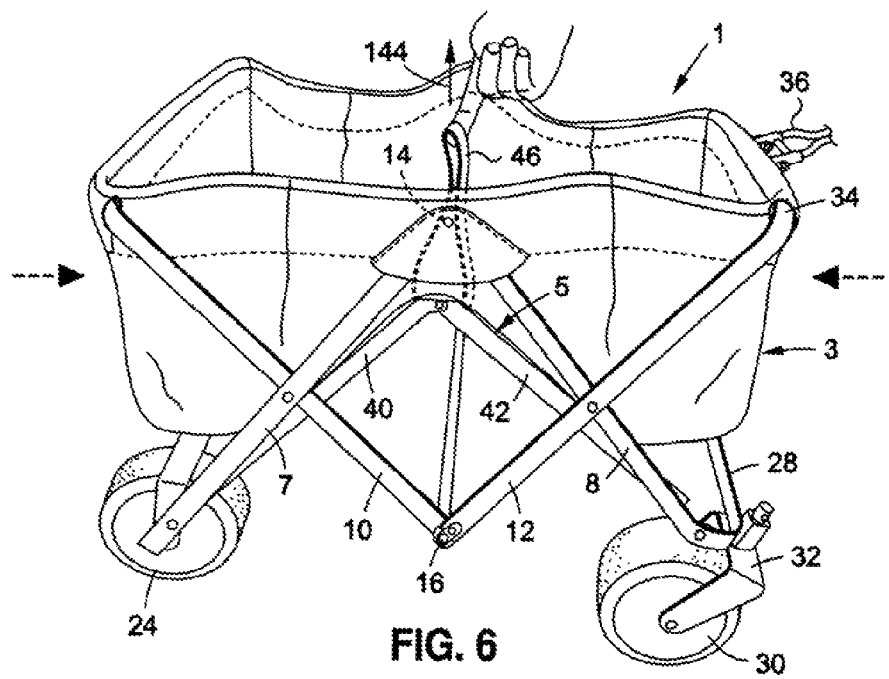
FIG. 6 shows the folding wagon being folded from its expanded open configuration of FIG. 1 to a compact collapsed configuration in response to an upward pulling force being applied to the basket of the wagon.

The opposite end of the side support arm 8 of the first of the pair of side support arms 7 and 8 bends continuously around the front and the bottom of the folding wagon 1 at which to form a front wheel support track (designated 28 and best shown in FIG. 6). The front wheel support track 28 is spaced from and located ahead of the basket support rack 5 at which a pair of front wheels (only one of which 30 being shown) of the folding wagon 1 are mounted. Each front wheel 30 is connected to the front wheel support track 28 by means of a pivotal front wheel bracket 32.

An extension of the opposite end of the side support arm 10 of the second pair of side support arms 10 and 12 bends continuously around the rear and top of the folding wagon 1 to form a rear basket support (not shown). The rear of the basket 3 is folded over and around the rear basket support formed by the extension of the side support arm 10 to help hold the basket 3 up so as to stand above the basket support rack 5 when the wagon 1 is in its expanded open configuration.

Likewise, an extension of the apposite end of the side support arm 12 of the second pair of side support arms 10 and 12 bends continuously around the front and top of the folding wagon 1 to form a front basket support 34. The front of the basket 3 is folded over and around the front basket support 34 formed by the extension of the side support arm 12 to help hold the basket 3 up so as to stand above the basket support track 5 when the wagon is in its expanded open configuration.

A wagon transport handle 36 is pivotally connected to the front basket support 34 at the front of the folding wagon 1 (best shown in FIG. 6). A pulling force or a pushing force is applied to the wagon transport handle 36 by a user to cause the pairs of rear and front wheels 24 and 30 to roll over a surface by which the wagon 1 can be transported from place-to-place in a forward or backward direction. Flexible U-shaped wagon retention handles 38 (best shown in FIGS. 7-9) are attached to and extend outwardly from the front and the rear of the basket 3. As will soon be explained, the wagon retention handles 38 can be coupled to one another so as to hold the wagon 1 in its closed configuration standing upright on the ground. As is best shown in FIGS. 8 and 9, when the folding wagon 1 has been folded to its compact closed configuration, the pairs of front and rear wheels 30 and 24 are moved side-by-side one another on the ground, and the wagon transport handle 36 is rotated downwardly to lie on the ground, so that a stand is created for holding the folded wagon upright on the ground.

Figure 2:
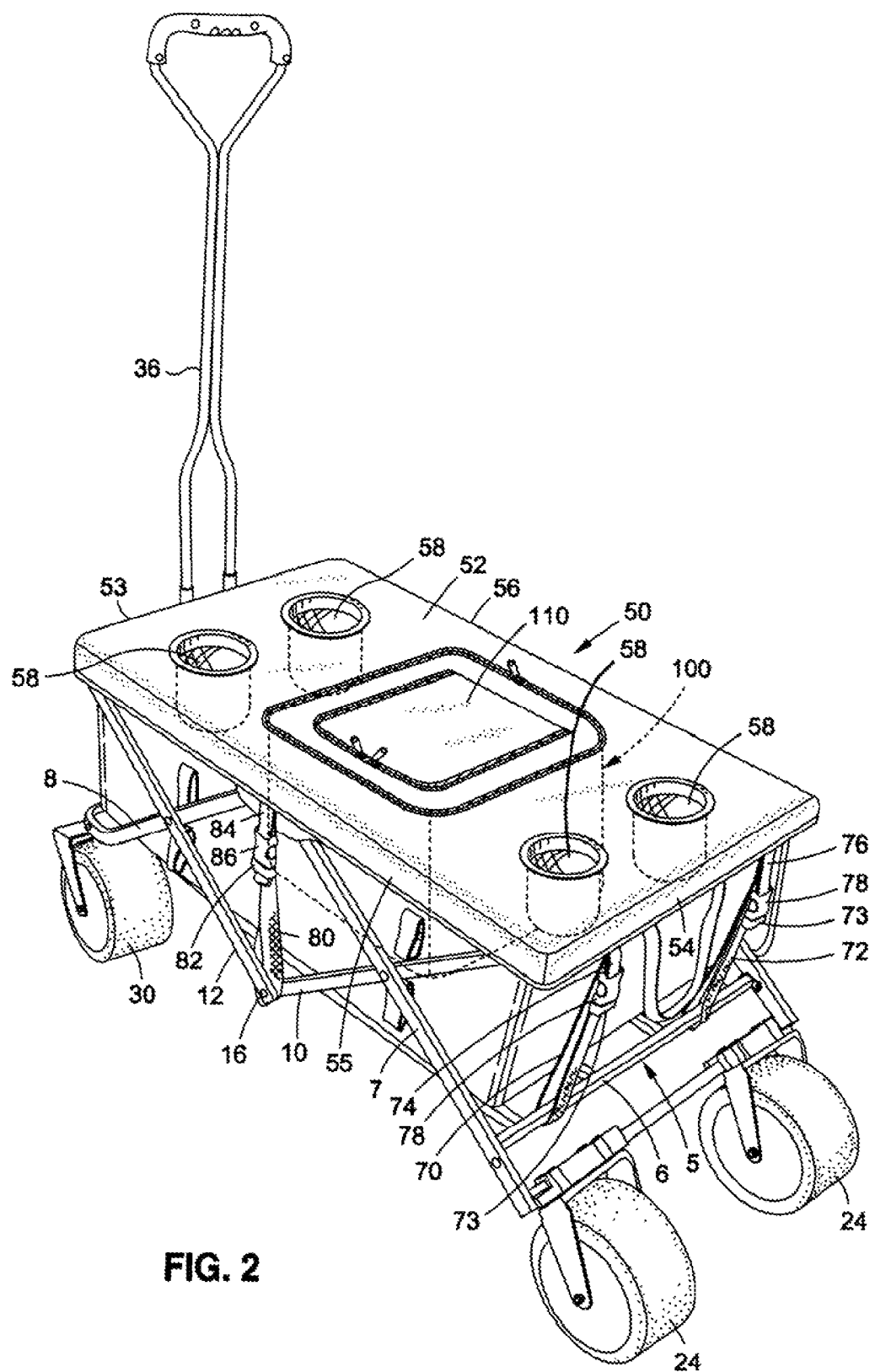
FIG. 2 shows the flexible table removably attached to the folding wagon of FIG. 1 so as to lay across the open top of the basket of the wagon.

Referring concurrently now to FIGS. 1-5 of the drawings, details are provided of the flexible table 50 which is removably attached across the open top of the basket 3 of the folding wagon 1. The table 50 is preferably manufactured from a flexible waterproof material such as nylon or the like. By way of example only, the wagon basket 3 and the table 50 can be manufactured from an identical material. As is best shown in FIG. 2, the table 50 is sized to surround and cover the open top of basket 3. To this end, the table 50 has a flat top 52. A pair of opposite ends 53 and 54 and a pair of opposite sides 55 and 56 of table 50 bend downwardly from the flat top 52 to surround the basket 3 when the table 50 is attached to the wagon 1.

A set of (e.g., four) cup holders 58 is formed in the top 52 of the table 50 in which to receive respective drinking cups (not shown). The cup holders 58 are preferably cylindrical cavities that are recessed downwardly from the table 50 above the wagon basket 3 to provide support for and retain the cups received therein in order to prevent the cups from tipping over.

Figure 3:
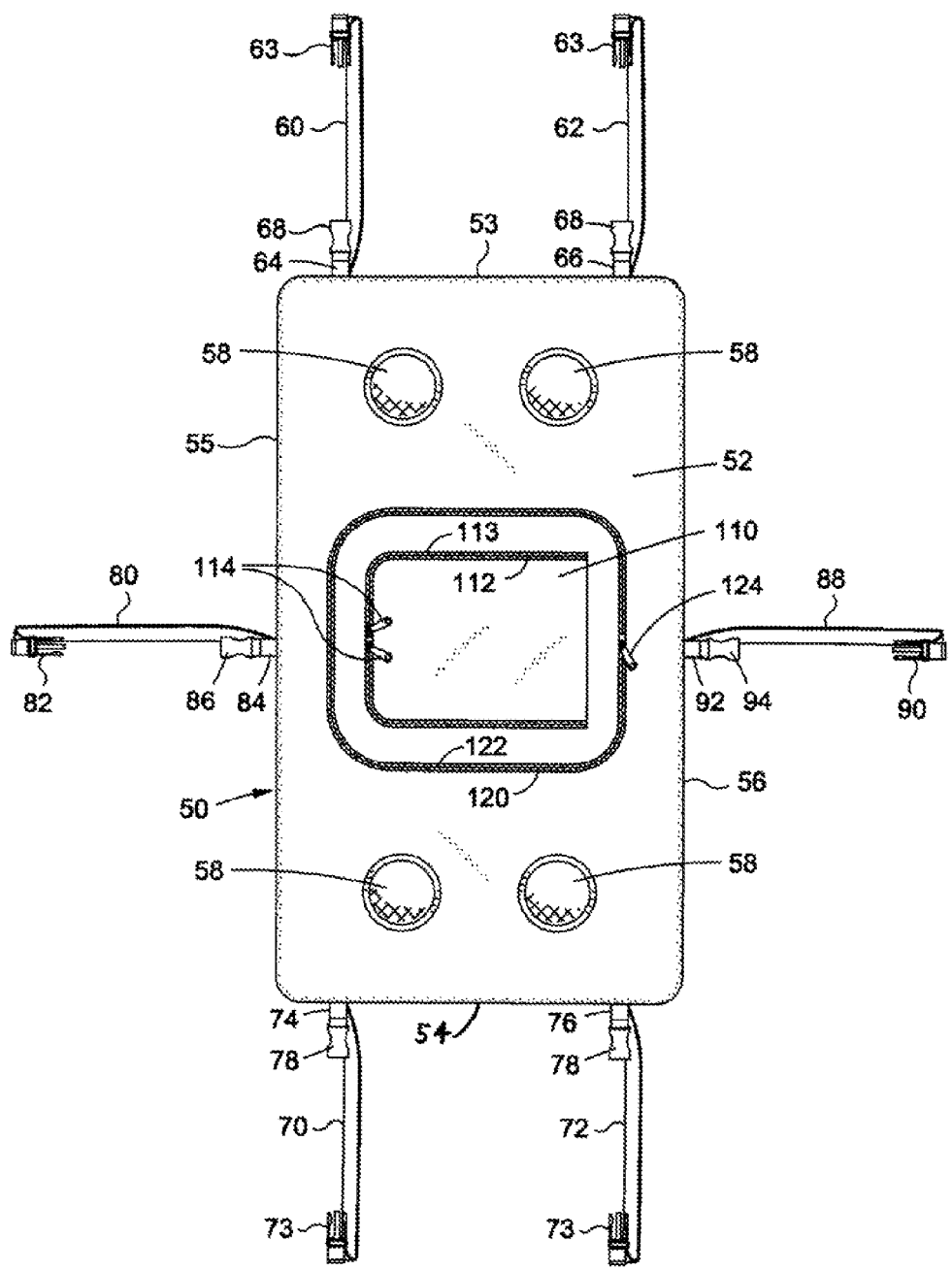
FIG. 3 is a top view of the flexible table to be removably attached to the folding wagon of FIG. 1.

As is best shown in FIGS. 2 and 3, one end of each of a first pair of table attachment straps 60 and 62 is affixed to and extends outwardly from the front end 53 of the table 50. A locking clip 63 is attached to the opposite end of each of the first pair of attachment straps 60 and 62. Located adjacent respective ones of the table attachment straps 60 and 62 is a first pair of table coupling straps 64 and 66 which are affixed at first ends thereof to and extend outwardly from the front end 53 of the table 50. A locking sleeve 68 is attached to the opposite end of each of the first pair of coupling straps 64 and 66. Each locking clip 63 is adapted to slide into receipt by and detachable locking engagement with a complementary locking sleeve 68 by which the removable table 50 is attached to the folding wagon 1 in a manner that will soon be described.

One end of each of a second pair of table attachment straps 70 and 72 is affixed to and extends outwardly from the rear end 54 of the table 50. A locking clip (identical to the locking clip 63) is attached to the opposite end of each of the second pair of attachment straps 70 and 72. Located adjacent respective ones of the table attachment straps 70 and 72 is a second pair of table coupling straps 74 and 76 which are affixed at first ends thereof to and extend outwardly from the rear end 54 of the table 50. A locking sleeve 78 (identical to the locking sleeve 68) is attached to the opposite end of each of the second pair of coupling straps 74 and 76. Each locking clip 73 is adapted to slide into receipt by and detachable locking engagement with a complementary locking sleeve 78 in order to attach the removable table 50 to the folding wagon 1 as will soon be described.

One end of another table attachment strap 80 is affixed to and extends outwardly from a first side 55 of the table 50. A locking clip 82 (identical to locking clips 63 and 73) is attached to the opposite end of the attachment strap 80. Located adjacent the table attachment strap 80 is another table coupling strap 84 which is affixed at a first end thereof to and extends outwardly from the first side 55 of the table 50. A locking sleeve 86 (identical to locking sleeves 68 and 78) is attached to the opposite end of the coupling strap 84. The locking clip 82 is adapted to slide into receipt by and detachable locking engagement with the complementary locking sleeve 86 in order to attach the removable table 50 to the folding wagon 1.

One end of another table attachment strap 88 is affixed to and extends outwardly from an opposite side 56 of the table 50. A locking clip 90 (identical to locking clips 63, 73, and 82) is attached to the opposite end of the attachment strap 88. Located adjacent the table attachment strap 88 is another table coupling strap 92 which is affixed at a first end thereof to and extends outwardly from the opposite side 56 of the table 50. A locking sleeve 94 (identical to locking sleeves 68, 78 and 86) is attached to the opposite end of the coupling strap 92. The locking clip 90 is adapted to slide into receipt by and detachable locking engagement with the complementary locking sleeve 94 in order to attach the removable table 50 to the folding wagon 1.

Referring specifically to FIGS. 2-4, a description is provided of a preferred method for attaching the removable table 50 to the folding wagon 1 so as to lie over and cover the open top of the basket 3 thereof. However, it is to be understood the order in which the following attachment steps are performed should not be regarded as a limitation of this invention.

Initially, the first pair of table attachment straps 60 and 62 which extend from the front end 53 of the table 50 are pulled under and around the front end (not shown) of the basket support rack 5 upon which the wagon basket 3 is seated and supported. The locking clips 63 that are carried by the table attachment straps 60 and 62 are then moved into detachable locking engagement with respective ones of the complementary locking sleeves 68 that are carried by the first pair of table coupling straps 64 and 66 which lie adjacent the attachment straps 60 and 62.

Next, the second pair of table attachment straps 70 and 72 which extend from the rear end 54 of the table 50 are pulled under and around the rear end 6 of the basket support rack 5. The locking clips 73 that are carried by the table attachment straps 70 and 72 are then moved into detachable locking engagement with respective ones of the complementary locking sleeves 78 that are carried by the second pair of table coupling straps 74 and 76 which lie adjacent the attachment straps 70 and 72.

Finally, the table attachment straps 80 and 88 which extend from the first and opposite sides 55 and 56 of the table 50 are wrapped around the frame of the folding wagon 1 so that the locking clips 82 and 90 that are carried by table attachment straps 80 and 88 can be moved into detachable locking engagement with respective ones of the complementary locking sleeves 86 and 94 that are carried by the table coupling straps 84 and 92 which lie adjacent attachment straps 80 and 88.

By way of particular example, and as is best shown in FIG. 2, the table attachment strap 80 which extends from the first side 55 of the table 50 is pulled under and below the intersection (i.e., the pivot coupling 16) of the aforementioned pair of side support arms 10 and 12 from one side of the wagon frame that holds the basket 3 standing upwardly above the basket support rack 5. The locking clip 82 that is carried by the table attachment strap 80 is then moved into detachable locking engagement with the complementary locking sleeve 86 that is carried by the adjacent table coupling strap 84.

With the locking clips 63, 73, 82 and 90 mated to their complementary locking sleeves 68, 78, 86 and 94 as just described, the flexible table 50 will be held down against the folding wagon 1 to surround the basket 3. In this case, the flat top 52 of the table 50 extends across the open top of the basket 3 to provide a convenient surface upon which food, utensils and beverage containers can be laid at a picnic or similar event. When it is not in use, the flexible table 50 can be pulled off and removed from the wagon 1. In this case, the locking clips 63, 73, 782 and 90 are detached and separated from their complementary locking sleeves 68, 78, 86 and 94.

As an important feature of the folding wagon 1 and the removable table 50 therefor, a removable cooler 100 (best shown in FIG. 5) is carried by the wagon 1 and made accessible through an opening in the table 50. The cooler 100 has an outside surface that may be covered with the same (e.g., flexible nylon) material from which the table 50 is manufactured. The cooler has a hollow interior compartment 102 that is surrounded by insulating material within which to carry beverage containers, food and ice. An optional pocket 104 is located at opposite ends of the cooler 100 (only one pocket being shown) in which to carry napkins, eating utensils, and the like. Each pocket 104 has a see-through mesh portion 106 to enable users to visualize the contents of the pocket. A handle 108 is attached to opposite sides of the cooler 100 to enable the cooler to be lifted out of and removed from the folding wagon 1 so as to be transported from place-to-place.

Located at the top 101 of the cooler 100 above the hollow compartment 102 thereof is a flexible rectangular flap or closure 110. A conventional zipper track 112 surrounds three sides of the rectangular closure 110. The closure 110 is pivotally attached at its fourth side to the top 101 of the cooler 100. A complementary zipper track 113 lies on and extends around some of the top 101 of the cooler 100 opposite the zipper track 112. First zipper pull tabs 114 are pulled in either a first or an opposite direction around the zipper tracks 112 and 113 to either close the closure 110 over and across the top 101 of the cooler 100 and thereby prevent access to the hollow interior compartment 102 or open the closure 110 at the top 101 of the cooler and thereby permit access to and the removal of the contents being carried within the interior compartment 102.

The cooler 100 is grasped at the handle 108 to be lifted out of and removed from the folding wagon 1 by way of a cooler access opening 118 that is formed through the top 52 of the table 50. The cooler access opening is sized and shaped to receive the cooler 100 therethrough. An outer zipper track 120 is located on the top 52 of the table 50 to surround the cooler access opening 118 through the table. A complementary inner zipper track 122 is located on the cooler 100 to surround the top 101 thereof. A second zipper pull tab 124 is pulled in either a first or an opposite direction around the zipper tracks 120 and 122 to either attach the top 101 of the cooler 100 to the top 52 of the removable table 50 whereby the cooler 100 and the table 50 are connected to one another or disconnect the cooler 100 from the table 50 to allow the cooler to be removed from the folding wagon 1.

In this regard, it may be appreciated that with the top 101 of cooler 100 attached by means of the complementary zipper tracks 120 and 122 to the top 52 of table 50, the hollow interior compartment 102 of the cooler 100 is seated upon the basket 3 (best illustrated in FIG. 2) to be transported by the wagon 1. Moreover, the table 50 is held up and supported over the basket 3 by the cooler 100 to prevent the table 50 from sagging or collapsing downwardly and into the basket 3.

In the case where the top 101 of the cooler 100 is detached from the top 52 of the table 50 such that the cooler and the table are disconnected from one another, the cooler handle 108 can be pulled upwardly so that the cooler 100 can be lifted out of the folding wagon 1 through the cooler access opening 118 that is formed in table 50. The aforementioned closure 110 lying over the cooler 100 may then be opened and folded back to permit access to and removal of the refrigerated contents being carried in the hollow interior compartment 102 of cooler 100. In this same regard, when the flexible table 50 has been detached from the folding frame of the folding wagon 1 and the cooler and the table are disconnected from one another, the table 50 can be removed from the wagon 1 to be folded up for storage and/or transport within the basket 3 of the wagon.

Turning now to FIGS. 7-9 of the drawings, the folding wagon 1 is shown in its previously described compact collapsed configuration. In this case, the pairs of front and back wheels 24 and 30 are aligned side-by-side on the ground and the pivotal transport handle 36 is rotated downwardly to engage the ground so that a stand is created for holding the wagon upright in a substantially vertical orientation. The wagon basket 3 is shown collapsed upon itself when the opposite ends of the basket support rack 5 (designated 40 and 42 in FIG. 6) are rotated to lie face-to-face one another.

As previously described, a pair of flexible wagon retention handles 38 depend from the front and rear of the wagon basket 3. As is best shown in FIG. 1, one of the wagon retention handles 38 has a handle closure 46 attached (e.g. sewn) thereto. A strip 48 of hook and loop (i.e., Velcro®) fastener material runs across the handle closure 46. The handle closure 46 is manufactured from a fastener material that is complementary to the hook and loop fastener material. With folding wagon 1 in its collapsed configuration, the pair of wagon retention handles 38 are pulled together (best shown in FIG. 7). The handle closure 46 is then wrapped around the wagon retention handles 38 and releasably attached to itself at the strip 48 of fastener material. Accordingly, the wagon retention handles 38 are held together to correspondingly hold the folding wagon in its collapsed configuration and provide a convenient wagon lift.

With the folding wagon 1 being held in its collapsed configuration as just described, a removable hood 130 (best shown in FIGS. 8 and 9) is moved over and around the top of the wagon 1 to prevent the wagon from inadvertently unfolding to its expanded open configuration. The removable hood 130 has an opening 132 formed through the top thereof to accommodate the pair of wagon retention handles 38 and a mesh pocket 134 attached to the front.

A pair of hood attachment straps (designated 136 of FIG. 7) with hood locking clips 138 at first ends thereof are connected at their opposite ends to one side of the hood 130. A pair of hood coupling straps (designated 140 in FIG. 8) with hood locking sleeves 142 at first ends thereof are connected at their opposite ends to the opposite side of the hood 130. When the hood attachment straps 136 are pulled through the folded basket support rack 5, the hook locking clips 138 can be moved into mating engagement with respective ones of the hood locking sleeves 142 carried by the hood coupling straps 140. By virtue of the foregoing, the removable hood 130 will be held down and in place so as to surround the top of the wagon 1 in its collapsed configuration.

The invention claimed is:
1. A combination comprising:
a wagon having a frame, at least one wheel to enable the wagon to roll over a flat surface, and a basket coupled to said frame in which to transport a variety of articles, said basket having an open top and a closed bottom; and a table attached to said wagon so as to lie over and cover the open top of the wagon basket, wherein said frame includes a basket support rack upon which said basked is supported, and wherein said table includes at least first and second table attachment straps connected thereto and extending outwardly therefrom, said first and second table attachment straps coupled to the basket support rack of said frame by which said table is attached to said wagon at the basket support rack so as to lie over and cover the top of said basket.

2. The combination recited in claim 1, wherein said table is manufactured from a flexible material.

3. The combination recited in claim 1, wherein said table has a plurality of cup holders formed therein and lying above said wagon basket.

4. The combination recited in claim 1, wherein the first and second table attachment straps of said table are detachably connected to the basket support rack of said frame such that said table is removably attached to said wagon at said frame thereof.

5. The combination recited in claim 4, wherein the basket support rack of said frame includes first and opposite ends upon which said wagon basket is seated and supported, said first and opposite ends being pivotally connected to each other so as to be rotatable towards one another by which said wagon is folded from an expanded open configuration, at which said wagon basket is open to receive the variety of articles to be transported, to a compact closed configuration, at which said wagon basket is collapsed upon itself.

6. The combination recited in claim 5, further comprising a removable hood surrounding the basket support rack of said wagon frame and the collapsed wagon basket when said wagon is folded to said compact closed configuration.

7. The combination recited in claim 5, wherein said wagon basket is responsive to an upward pulling force applied thereto to correspondingly cause the first and opposite ends of said basket support rack of said wagon frame to rotate towards one another by which said wagon is folded from said expanded open configuration to said compact closed configuration.

8. The combination recited in claim 4, wherein the basket support rack of said wagon frame has a front, a rear and a pair of opposite sides, the first and second table attachment straps which extend outwardly from said table being detachably connected to said basket support rack at respective ones of either said front and rear thereof or at said pair of opposite sides thereof.

9. The combination recited in claim 8, wherein said first and second table attachment straps which extend outwardly from said table are wrapped around respective ones of either the front and rear of said basket support rack or the pair of opposite sides of said basket support rack by which said table is removably attached to said basket support rack of said wagon frame.

10. The combination recited in claim 8, wherein each of said first and second table attachment straps has a first end connected to said table and an opposite end connected to a locking clip, said table further including a front, a rear, a pair of opposite sides, and at least first and second table coupling straps extending outwardly therefrom, said first and second table coupling straps having first ends connected to said table at respective ones of either said front and rear thereof or at said pair of opposite sides thereof, and said first and second table coupling straps having opposite ends connected to respective locking sleeves, the locking clips connected to said first and second table attachment straps being detachably connected to respective ones of the locking sleeves connected to said first and second table coupling straps, whereby said table is removably attached to said wagon so as to lie over and cover said wagon basket.

11. The combination recited in claim 1, further comprising a cooler in which to carry and keep food and beverages cold, said cooler located within and transported by said wagon basket, and said table being detachably connected to said cooler.

12. The combination recited in claim 11, wherein said cooler has a compartment within which to receive and carry the food and beverages to be kept cold and a top located above said compartment, said table connected to said cooler at said top thereof such that said table is held over the open top of said wagon basket by said cooler.

13. The combination recited in claim 12, wherein said table has a cooler access opening formed therein and communicating with said wagon basket, said cooler being removed from said wagon basket and separated from said wagon by way of said cooler access opening after said table and said cooler have been disconnected from one another.

14. The combination recited in claim 13, further comprising a first zipper track surrounding the top of said cooler and a second zipper track surrounding the cooler access opening through said table, said first and second zipper tracks being mated to one another such that said table is detachably connected to said cooler at the top thereof.

15. The combination recited in claim 12, wherein said cooler has an opening formed in the top thereof that communicates with said compartment in which the food and beverages are carried and a closure which is movable between a closed position at which to close said opening and an open position at which to open said opening and permit access to the food and beverages carried in said compartment, said cooler also having a first zipper track surrounding at least some of said closure and a second zipper track extending around at least some of the top of said cooler, said first and second zipper tracks being mated to one another such that said closure is retained in said closed position.

16. A combination comprising:

a wagon having a frame, at least one wheel coupled to said frame to enable said wagon to roll over a flat surface, and a basket coupled to said frame in which to transport a variety of articles, said basket having an open top and a closed bottom;

a cooler in which to carry and keep food and beverages cold, said cooler located within and transported by said wagon basket; and a table attached to said wagon at said frame thereof, said table detachably connected to said cooler such that said table is held over the open top of said wagon basket by said cooler, and said table having a cooler access opening formed therein and communicating with the basket of said wagon, said cooler being removable from said wagon basket and separated from said wagon by way of said cooler access opening after said table and said cooler have been disconnected from one another.

17. The combination recited in claim 16, wherein said table is removably attached to the wagon at said flame thereof, said table being manufactured from a flexible material, such that said flexible table is foldable so as to be located within and transported by the basket of said wagon after said table has been detached and separated from the frame of said wagon.

18. A combination comprising:
- a wagon having a frame, at least one wheel coupled to said frame to enable the wagon to roll over a flat surface, and a basket coupled to said frame in which to transport a variety of articles, said basket having an open top and a closed bottom;
- a flat basket top attached to said wagon so as to lie over and cover the open top of the wagon basket; and
- a cooler located within and transported by said wagon basket, said cooler having a compartment within which to receive and carry food and beverages and to keep the food and beverages cold, said cooler also having a top located above the compartment thereof,
- said flat basket top being detachably connected to said cooler such that said flat basket top is held over the open top of said wagon basket by said cooler, said cooler being removable from said wagon basket and separated from said wagon after said flat basket top and said cooler have first been disconnected from one another.

19. The combination recited in claim 18, wherein said flat basket top has a cooler access opening formed therein and communicating with said wagon basket, said cooler being removed from said wagon basket and separated from said wagon by way of said cooler access opening after said flat basket top and said cooler have first been disconnected from one another.

20. The combination recited in claim 18, further comprising a first zipper track surrounding the top of said cooler and a second zipper track surrounding the cooler access opening through said flat basket top, said first and second zipper tracks being mated to one another such that said flat basket top is detachably connected to said cooler at the top thereof.

* * * * *